UNITED STATES PATENT OFFICE 2,547,686

PREPARATION OF SUCCINONITRILE

Charles E. Brockway, Akron, Ohio, assignor to The B. F. Goodrich Company, New York, N. Y., a corporation of New York No Drawing. Application December 2, 1949, Serial No. 130,866

5 Claims. (Cl. 260—465.8)

This invention relates to the preparation of succinonitrile and more specifically pertains to the preparation of succinonitrile by reacting acrylonitrile (vinyl cyanide) with a ketone cyanohydrin.

Acrylonitrile is a well known cyanoethylating agent reacting with the active hydrogen of an OH group of many organic compounds to produce the corresponding cyanoethyl derivatives. For example, aldehyde cyanohydrins such as glyconitrile and lactonitrile react with acrylonitrile to form cyanoethyl derivatives. Accordingly, it was to be expected that reaction between acrylonitrile and a ketone cyanohydrin would also result in cyanoethylation of the hydroxyl group according to the following equation:

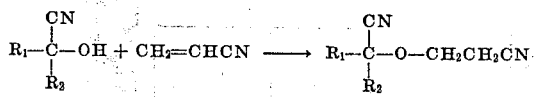

where $R_1$ and $R_2$ are hydrocarbon radicals.

I have discovered, however, that ketone cyanohydrins react with acrylonitrile in the presence of a basic material as catalyst to form succinonitrile rather than the expected cyanoethyl derivatives. The reaction to form the succinonitrile proceeds as follows:

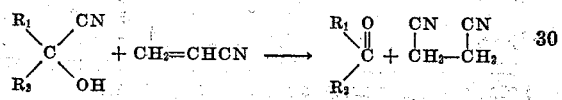

where $R_1$ and $R_2$ are hydrocarbon radicals. As this latter equation indicates the ketone from which the starting cyanohydrin is derived is formed as a by-product of the reaction. Consequently, the ketone can be recovered and reacted with hydrogen cyanide to reform the cyanohydrin for further use as a reactant.

The basic material which is employed as catalyst in the process of this invention is not critical and may be either inorganic or organic. Especially suitable are tertiary amines such as trimethyl amine, triethyl amine, tributyl amine, tricyclohexyl amine, tribenzyl amine, hexamethylene tetramine, pyridine, triethanol amine and the like; ammonium hydroxide and quaternary ammonium bases such as trimethyl benzyl ammonium hydroxide and the like; alkali and alkaline earth metal hydroxides such as sodium, potassium and calcium hydroxides and salts of strong bases with weak acids such as sodium or potassium carbonates, cyanides, acetates, propionates, benzoates, etc. However, other basic materials including primary and secondary amines such as ethyl amine, dimethyl amine, ethylene diamine, diethylene triamine, cyclohexyl amine, benzyl amine, ethanol amine, aniline, etc. are also suitable, it being understood that basic materials in general are operative. The amount of basic catalyst used is likewise not a critical factor and may be varied considerably with the material used but in general from 0.5 to 5% of catalyst based on the total weight of the reactants is employed.

As indicated by the last written equation above any desired ketone cyanohydrin can be employed. However, since the ketone residue of the cyanohydrin is recovered during the reaction and since aromatic ketones such as acetophenone, benzophenone and the like are high boiling liquid or solid materials which are rather difficultly separated from the succinonitrile, it is preferred that the ketone cyanohydrin employed be an aliphatic or alicyclic ketone cyanohydrin. Best results are obtained when using ketone cyanohydrins of the structure

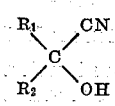

wherein each of $R_1$ and $R_2$ represents an alkyl or cycloalkyl radical or wherein $R_1$ and $R_2$ combined represent a cycloalkylene radical and wherein the number of carbon atoms in $R_1$ and $R_2$ combined is between 2 and 12. Specific examples of preferred aliphatic and alicyclic ketone cyanohydrins include acetone cyanohydrin, methyl ethyl ketone cyanohydrin, methyl butyl ketone cyanohydrin, methyl isobutyl ketone cyanohydrin, methyl propyl ketone cyanohydrin, methyl isopropyl ketone cyanohydrin, methyl amyl ketone cyanohydrin, methyl isoamyl ketone cyanohydrin, methyl hexyl ketone cyanohydrin, diethyl ketone cyanohydrin, ethyl propyl ketone cyanohydrin, ethyl isopropyl ketone cyanohydrin, ethyl butyl ketone cyanohydrin, ethyl isobutyl ketone cyanohydrin, ethyl amyl ketone cyanohydrin, ethyl isoamyl ketone cyanohydrin, ethyl hexyl ketone cyanohydrin, dipropyl ketone cyanohydrin, diisopropyl ketone cyanohydrin, propyl isopropyl ketone cyanohydrin, propyl butyl ketone cyanohydrin, isopropyl butyl ketone cyanohydrin, propyl isobutyl ketone cyanohydrin, isopropyl isobutyl ketone cyanohydrin, propyl amyl ketone cyanohydrin, isopropyl amyl ketone cyanohydrin, propyl hexyl ketone cyanohydrin, isopropyl hexyl ketone cyanohydrin, the butyl amyl ketone cyanohydrins, the butyl hexyl ketone cyanohydrins, the diamyl ketone cyanohydrins, the amyl hexyl ketone cyanohydrins, the dihexyl ketone cyanohydrins, dicyclopentyl ketone cyanohydrin, dicyclobutyl ketone cyanohydrin, dicyclohexyl ketone cyanohydrin, methyl cyclopropyl ketone cyanohydrin, methyl cyclopentyl ketone cyanohydrin, methyl cyclohexyl ketone cyanohydrin, ethyl isopropyl ketone cyanohydrin, propyl cyclohexyl ketone cyanohydrin, isopropyl cyclohexyl ketone cyanohydrin, butyl cyclohexyl ketone cyanohydrin, isobutyl cyclohexyl ketone cyanohydrin, amyl cyclohexyl ketone cyanohydrin, n-hexyl cyclohexyl ketone cyanohydrin, cyclobutanone cyanohydrin, cyclopentanone cyanohydrin and cyclohexanone cyanohydrin.

The process of forming succinonitrile is readily and conveniently carried out by combining acrylonitrile and the ketone cyanohydrin in any desired proportions but preferably in substantially equimolecular proportions, adding a basic catalyst, heating the resulting mixture until reaction begins and then controlling the reaction temperature within the range of 50° C. to 150° C. until the reaction is complete. Since the reaction is exothermic, the completion of the reaction is evidenced by the cessation of heat liberation.

After the reaction is complete, the mixture is preferably cooled to room temperature and the basic catalyst neutralized. Then succinonitrile is recovered from the reaction mixture in any desired manner. In the preferred method the reaction mixture is distilled, employing reduced pressure where necessary to reduce decomposition and charring, to separate and recover the various components of the mixture. In this manner succinonitrile in excellent yield and in a high degree of purity is obtained.

The following specific examples are given to illustrate the detailed practice of this invention as well as to illustrate the various modifications which are within its scope. In all of the examples the parts are parts by weight.

*Example I*

To a reactor equipped with a mechanical stirrer, a reflux condenser, a thermometer and a means for heating and cooling its contents, there was added 53 parts of acrylonitrile, 85 parts of acetone cyanohydrin, and 1.4 parts of sodium hydroxide (1.0% by weight based on the total reactants) dissolved in 1.4 parts of water. The mixture was stirred and slowly heated to 65° C. where spontaneous reflux began. Although heating of the reactants was stopped, the reaction temperature rose to 78° C. in 25 minutes during which time it was necessary to cool the reactants intermittently to maintain and control the reflux rate. The original colorless mixture gradually changed to a dark red-brown during the reaction. As the reaction decreased in intensity heat was again applied to maintain a reaction temperature of about 75° C. to 80° C. for an additional 25 minutes after which time the temperature of the reaction mixture would drop and refluxing would cease as soon as the external source of heat was removed thus indicating completion of the reaction. The mixture resulting from the reaction was cooled rapidly to room temperature and the basic catalyst, sodium hydroxide, was neutralized with 2.5 parts of 85% phosphoric acid. This mixture was transferred to a still pot and fractionated. The following fractions were recovered:

| Fraction | Boiling Point | Parts |
|---|---|---|
| 1 | 55° C. to 63° C. at atmos. pressure | 50.6 |
| 2 | 63° C. to 137° C. at 12 mm. Hg | 6.1 |
| 3 | 95° C. to 125° C. at 1.0 mm. Hg | 68.1 |
| 4 | Black Resin Residue | 16.7 |

Fraction 1 was identified as containing predominantly acetone. Fraction 3 was a nearly colorless waxy cake representing an 85% yield of succinonitrile with a clear point of 53° C. (the clear point being that temperature at which a small sample of the material became completely clear when slowly heated in a small test tube). The clear point remained unchanged when a portion of fraction 3 was mixed with a portion of pure succinonitrile having a clear point of 57° C. A sample of fraction 3 was hydrolyzed to yield a material having a melting point of 186° C. to 187° C., the melting point of succinic acid. Consequently, the material called fraction 3 was succinonitrile.

The clear point described above was employed as a means for determining the purity of succinonitrile prepared by my process. Redistilled authentic succinonitrile was found to have a clear point of 57° C. Known quantities of acetone cyanohydrin were added to the redistilled material and the depression of the clear point was determined. The following table gives the results of these findings.

*Table I*

| Percent by Weight of Cyanohydrin | Clear Point Degrees Centigrade |
|---|---|
| 0 | 57 |
| 1 | 55 |
| 2 | 53 |
| 3 | 50 |

By using the above tabulated clear points it is apparent that the succinonitrile prepared in Example I with a clear point of 53° C. contained little impurities, no more than 2%. The succinonitrile prepared in Examples II to XII hereinbelow was also of high purity, as will be apparent.

EXAMPLES II TO XII

In Examples II to XII the method as used in Example I was employed with the footnoted exceptions shown in Table II. The reactants, acrylonitrile and ketone cyanohydrin, were employed in equimolecular proportions as in Example I. The pertinent reaction data as well as the results of these examples are tabulated below in Table II. The identity of the succinonitrile formed in each example was established by the clear point of the product, the mixed clear point with authentic succinonitrile and by hydrolysis of part of each product to succinic acid. In each case a ketone corresponding to the original ketone cyanohydrin employed was also recovered from the reaction mixture.

Table II
ACRYLONITRILE REACTED WITH KETONE CYANOHYDRIN

| Example Number | Cyanohydrin of Ketone | Catalyst, per cent by weight, based on total reactants | Reaction Time, Min. | Reaction Temp., °C. | Succinonitrile Per Cent Yield | Succinonitrile Clear Point °C. |
|---|---|---|---|---|---|---|
| II [1] | Acetone | Triethylamine, 2% | 42 | 67–78 | 74 | 56 |
| III | ___do___ | NaOH, 1% | 48 | 65–75 | 85 | 53 |
| IV | ___do___ | Trimethylbenzylammonium-hydroxide, 2% | 29 | 67–75 | 86 | 50 |
| V | ___do___ | $K_2CO_3$, 2% | 34 | 67–75 | 83 | 53 |
| VI | ___do___ | NaCN, 2% | 47 | 63–76 | 85 | 53 |
| VII [2] | ___do___ | $Ca(OH)_2$, 2% | 92 | 65–74 | 17 | 49 |
| VIII [1] | Methyl Ethyl Ketone. | Triethylamine, 2% | 55 | 65–92 | 78 | 57 |
| IX | ___do___ | NaOH, 1% | 35 | 64–91 | 83 | 54 |
| X | Methyl n-Hexyl Ketone. | $K_2CO_3$, 2% | 61 | 68–105 | 88 | 49 |
| XI | Methyl Isopropyl Ketone. | NaOH, 1% | 42 | 71–93 | 88 | 52 |
| XII | Cyclohexanone | NaCN, 2% | 107 | 73–95 | 95 | 45 |

[1] Catalyst not neutralized before distillation because basic catalyst was volatile.
[2] Heat applied during entire reaction.

As illustrated by Examples II and VIII, when a volatile basic catalyst is employed in the process, it is not necessary to neutralize the base before distillation to recover the succinonitrile. The volatile base can be removed with one of the low boil fractions and re-used. When a nonvolatile base is employed as catalyst, however, it is preferably neutralized since the presence of basic material during the later stages of distillation may tend to cause resinification of succinonitrile with a needless increase in loss of the desired product.

Having described my invention by means of specific examples, I do not thereby desire or intend to limit myself solely thereto, for as hereinbefore stated the proportions of reactants and reaction conditions employed may be varied and equivalent chemical compounds may be employed as set forth herein without departing from the spirit and scope of the invention as defined in the appended claims.

I claim:

1. The method of preparing succinonitrile which comprises reacting acrylonitrile with a ketone cyanohydrin selected from the class consisting of aliphatic and alicyclic ketone cyanohydrins in the presence of a basic catalyst at a temperature from 50° C. to 150° C. and recovering the succinonitrile thus formed.

2. The method of preparing succinonitrile which comprises reacting acrylonitrile with acetone cyanohydrin in the presence of a basic catalyst at a temperature from 50° C. to 120° C. and recovering the succinonitrile thus formed.

3. The method of preparing succinonitrile which comprises reacting acryonitrile with acetone cyanohydrin at a temperature from 50° C. to 120° C. in the presence of 0.5% to 5% by weight based on the total reactants of a basic material as a catalyst and recovering the succinonitrile thus formed.

4. The method of preparing succinonitrile which comprises preparing a reaction mixture containing acrylonitrile, a ketone cyanohydrin selected from the class consisting of aliphatic and alicyclic ketone cyanohydrins, and a basic catalyst, maintaining the said mixture at a temperature of 50 to 150° C. whereupon chemical reaction occurs to form succinonitrile and a ketone corresponding to the original ketone cyanohydrin, and finally fractionally distilling the mixture to separate and recover the succinonitrile and the said ketone.

5. The method of claim 4 wherein the cyanohydrin is acetone cyanohydrin and the basic catalyst is sodium hydroxide.

CHARLES E. BROCKWAY.

REFERENCES CITED

The following references are of record in the file of this patent:

UNITED STATES PATENTS

| Number | Name | Date |
|---|---|---|
| 2,205,239 | Carter et al. | June 18, 1940 |
| 2,397,341 | Ellingboe | Mar. 26, 1946 |
| 2,434,606 | Carpenter | Jan. 13, 1948 |
| 2,460,603 | Semon | Feb. 1, 1949 |

FOREIGN PATENTS

| Number | Country | Date |
|---|---|---|
| 707,852 | Germany | July 5, 1941 |

OTHER REFERENCES

Migrdichian: "Chem. of Org. Cyanogen Comp'ds," (Reinhold), p. 174, 1947.